Nov. 17, 1964 P. R. LOW ETAL 3,157,792

EXCLUSIVE-OR PHOTORESPONSIVE LOGICAL CIRCUITS

Filed Jan. 21, 1960 8 Sheets-Sheet 1

INVENTORS
PAUL R. LOW
REX RICE

BY Curtis Ailes Jr.
ATTORNEY

EXCLUSIVE-OR PHOTORESPONSIVE LOGICAL CIRCUITS

Filed Jan. 21, 1960 8 Sheets-Sheet 4

FIG.10

| INPUTS | | INPUT FUNCTION CONDITIONS |
|---|---|---|
| INPUT FUNCTION ———— | A | 0011 |
| INPUT FUNCTION ———— | B | 0101 |

| OUTPUT FUNCTION SELECTED | | RESULTING OUTPUTS |
|---|---|---|
| NULLARY – POSITIVE | 16 | 1111 |
| NOT BOTH – (SHEFFER STROKE) | 15 | 1110 |
| IF THEN (B,A) | 14 | 1101 |
| SINGULARY (WITH INVERSION A) | 13 | 1100 |
| IF THEN (A,B) | 12 | 1011 |
| SINGULARY (WITH INVERSION B) | 11 | 1010 |
| IF AND ONLY IF | 10 | 1001 |
| NEITHER NOR | 9 | 1000 |
| OR | 8 | 0111 |
| EXCLUSIVE OR | 7 | 0110 |
| SINGULARY (NO INVERSION – B) | 6 | 0101 |
| NOT IF THEN (B,A) | 5 | 0100 |
| SINGULARY (NO INVERSION – A) | 4 | 0011 |
| NOT IF THEN (A,B) | 3 | 0010 |
| AND | 2 | 0001 |
| NULLARY – NEGATIVE | 1 | 0000 |

EXCLUSIVE-OR PHOTORESPONSIVE LOGICAL CIRCUITS

Filed Jan. 21, 1960 8 Sheets-Sheet 6

United States Patent Office 3,157,792
Patented Nov. 17, 1964

3,157,792
EXCLUSIVE-OR PHOTORESPONSIVE LOGICAL CIRCUITS

Paul R. Low and Rex Rice, Poughkeepsie, N.Y., assignors to International Business Machines Corporation, New York, N.Y., a corporation of New York
Filed Jan. 21, 1960, Ser. No. 3,861
15 Claims. (Cl. 250—210)

This invention relates to logical circuits in which the logic is performed by combinations of electrically responsive light sources and electrical impedances connected in circuit therewith, certain of the electrical impedances being photoresponsive such as to change impedance value in response to light impinging thereon.

Ever since the advent of electrical data processing and calculating machinery, there has been a continuing search for systems which would provide greater simplicity and economy in manufacture and servicing. One helpful approach in achieving these goals has been to try to obtain as much logic as possible in a single level of switching.

It is one object of the present invention to provide for very simple and economical logical systems employing voltage responsive light sources and photoresponsive impedances for controlling the light sources.

Another object of the present invention is to provide simple and economical logic systems for receiving two or more input signals in various combinations and for supplying different outputs in response to the inputs in accordance with desired logical functions.

Another object of the present invention is to provide an economical system which is particularly well adapted to provide a logical output representing the "Exclusive-OR" function and other logical functions related to the "Exclusive-OR" function.

Another object of the present invention is to provide economical systems which are adapted to receive up to four or more digital input signals and to provide for successive changes in the output in response to each increase in the number of input signals.

Another object of the invention is to provide an economical system for obtaining, in one level of logic, various desired logical objectives including standard logical circuits such as a full binary adder.

In carrying out the above objects of this invention in one preferred embodiment thereof, a voltage responsive light source is provided having two terminals. An impedance network is connected to each terminal and each impedance network includes at least two impedances connected in series circuit relationship across a voltage source. At least two of the impedance have photoconductive properties to control the voltage at the terminal respectively associated therewith in response to light input signals impinging thereon.

For a more complete understanding of the invention and for an appreciation of other objects and advantages thereof, attention is directed to the following specification and the accompanying drawings which are briefly described as follows:

FIGURE 1 is a schematic diagram of one of the simplest forms of the invention which is capable of providing the "Exclusive-OR" function of two inputs.

FIGGURE 2 is a schematic diagram of a modification of the circuit of FIGURE 1 which also provides the "Exclusive-OR" function.

FIGURE 7 is a combination circuit following the teachings of the present invention which is capable of providing any selected one of three logical functions of two inputs, the functions being identified as AND, OR, or Exclusive-OR.

FIGURE 10 is a table which identifies the various functions which may be selected and obtained from the combination circuit of FIGURE 9.

Figure 12:
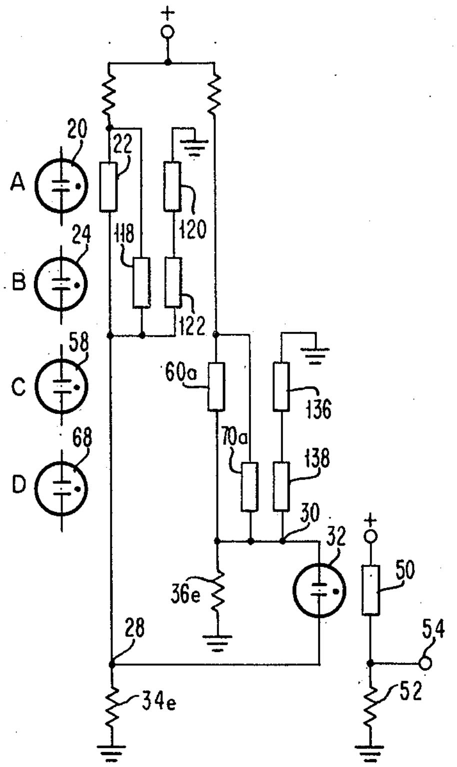

FIGURE 12 discloses a four input system which is capable of providing an output whenever there is an odd number of inputs, following the teachings of the present invention.

Figure 13:
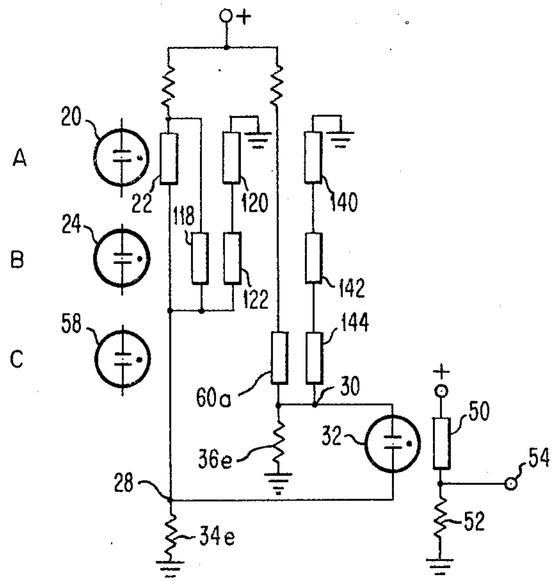

FIGURE 13 shows a three input system which provides an output only when there is but one input.

Figure 14:
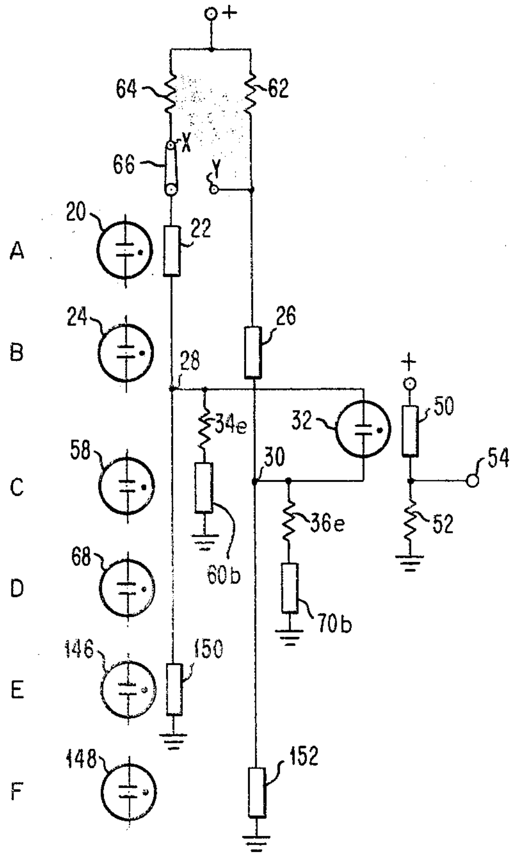

FIGURE 14 illustrates a general form of the invention which is capable of providing an output which is a function of up to six or more input signals.

Figure 15:
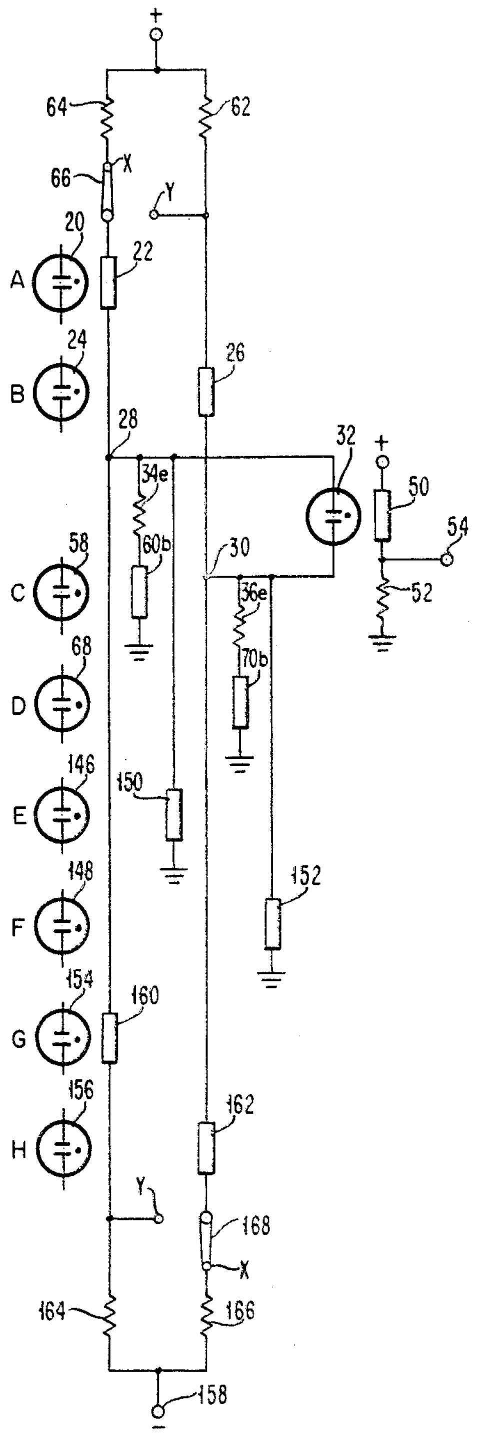

FIGURE 15 is a modification of the FIGURE 14 general form of the invention in which the lower branches of the circuit are connected to a negative potential source.

The operation of the embodiment of FIGURE 1 may be briefly described as follows: The input A manifested by the lighting of the voltage responsive light source 20 is arranged to illuminate photoconductor 22. Similarly, the input B controls the lighting up of light source 24 which is arranged to illuminate photoconductor 26. The circuits containing the photoconductors 22 and 26 are arranged to control the voltage levels on the input terminals 28 and 30 of the output light source 32. If the A input is present in the absence of a B input, the photoconductor 22 is illuminated and in a state of lowered resistance, causing the potential of terminal 28 to rise to a value which is sufficient to cause an output by the lighting of the output light source 32. A similar operation is possible in the presence of a B input in the absence of an A input such that photoconductor 26 achieves a low resistance state and terminal 30 rises in potential. However, if both A and B inputs are present, photoconductors 22 and 26 both achieve the low resistance state and terminals 28 and 30 both rise to approximately the same potential level so that there is insufficient potential cross these terminals to light the output light source 32. Thus, it is seen that this circuit provides the Exclusive-OR function in which an output is manifested only when there is a single input.

Both of the terminals 28 and 30 are grounded through the resistive impedances respectively indicated as 34 and 36. It is to be seen therefore that each terminal of the output light source 32 has associated therewith what may be described as an impedance network connected across a voltage source in a serial circuit relationship. In the case of terminal 28, this network includes the photoresponsive impedance 22 and the resistive impedance 34. Similarly, associated with light source terminal 30 are photoresponsive impedance 26 and resistive impedance 36. In each instance, the light source terminal is connected to the juncture between the two network impedances. This basic impedance network configuration is characteristic of the circuits of the present invention. As indicated in connection with other modifications of the invention to be described in connection with the other figures of the drawings, it will be shown that the impedances in the network branches corresponding to impedances 34 and 36 may contain the photoresponsive elements. Also, alternative network branches may be added to either or both of the networks and such additional branches may contain photoresponsive elements.

Figure 1:
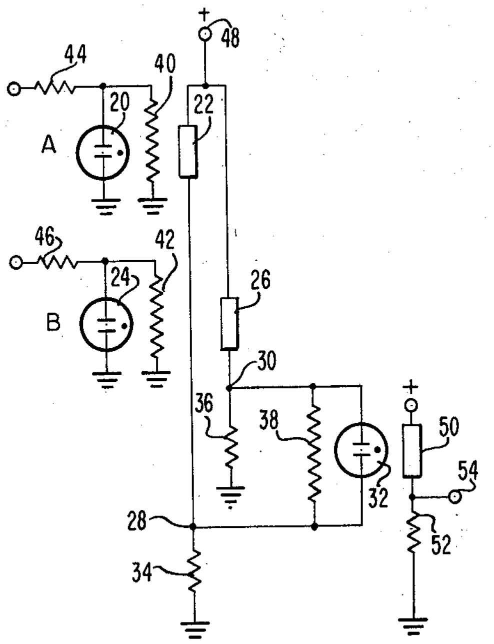

Throughout the various figures of the drawings, the small rectangular symbols employed for photoresponsive elements 22 and 26 in FIGURE 1 will be used to signify devices which have photoconductive properties. Although the term "photoconductive" is used to describe such devices it should be emphasized that devices of this description as employed in the systems of the present invention are really more accurately described as impedances which achieve a substantially reduced impedance value when they are illuminated. Thus it is contemplated that the impedance of one of these devices may be at least in the order of 200 megohms when not illuminated. But, when it is subjected to illumination its resistance may drop to a typical value in the order of 50,000 ohms and very seldom will the illuminated impedance go below a value of 10,000 ohms. Thus, it is to be seen that a device having a minimum resistance of thousands of ohms, although commonly referred to as a photoconductor, should be more accurately described as an impedance having photoresponsive properties. However, the terms "photoconductor" and the like will be used in this specification, keeping these qualifications in mind.

Photoconductive devices having impedance characteristics as described above are commercially available. For instance, one such device may be purchased at the present time from the Clairex Corporation, of 50 West 26th Street, in New York City, under model number 603A The typical impedance of the photoconductor as indicated above at 50,000 ohms when illuminated is applicable when the illumination is from a neon glow lamp which may be within reasonable proximity to the photoconductor. Small, inexpensive neon glow lamps which are suitable for this purpose are commonly available. A typical device of this kind is available for instance from the General Electric Company under Model No. NE–2. Such a device may require about 70 volts to initiate glow conduction when new, but after appreciable aging has occurred, the firing voltage may advance to the order of 115 volts. After such a device has become illuminated, a negative resistance effect is to be observed such that the voltage across the glow lamp may drop to about 55 volts in a fresh lamp, and may advance to a value in the order of 100 volts as the lamp progressively ages. The current required for such a neon may vary from one quarter of a milliampere to one milliampere.

It will be appreciated that various other voltage responsive light source devices may be employed and that other photoconductive devices may be used to detect the illumination from such devices. For instance, the voltage responsive light sources might be electroluminescent devices or incandescent filament devices or devices employing gaseous discharges to derive illumination from fluorescent coatings. In each instance, photoconductive devices would be selected which are particularly responsive to the spectrum of light emitted by the light sources employed. Fortunately, the neon lamps mentioned above and the photoconductive devices mentioned above work well together. Accordingly, the neons are preferred and the light sources in the present application are all indicated as being neon light sources, but it will be understood that other sources could be employed if desired.

One important advantage of the neon glow lamp as an electrical voltage responsive light source in the present system is the fact that it remains substantially completely dark until its firing voltage threshold is achieved, at which time it suddenly provides substantially full output illumination. This characteristic is very desirable because it helps to prevent false operation as long as the voltages across the output neon 32 are below the threshold value.

It is apparent that the inputs contemplated by the present invention are basically optical light inputs and might actually be supplied, for instance, by opening apertures to admit natural daylight for actuation thereof. However, it will usually be more convenient to employ electrical inputs which energize voltage responsive light sources such as neons 20 and 24 so as to derive each optical input from an electrical input.

With neon glow lamps, it is generally necessary that some series impedance be employed, as well as some shunt impedance. In FIGURE 1, the series impedance for the output light source 32 is supplied either by impedance 34 or impedance 36, and the shunt resistor 38 is provided across this device. Similar shunt resistors 40 and 42 are also provided across input lamps 20 and 24. The value of each of these shunt resistors is preferably about one megohm. This one megohm shunt resistor across each neon serves to set a maximum impedance for the neon with respect to the remainder of the circuit. Since the dark resistance of each of the photoconductors employed in this invention is in the order of 200 megohms, this maximum impedance of one megohm across each neon insures that a neon may never be switched on through a series connected non-illuminated photoconductor. Series resistors 44 and 46 are also provided for lamps 20 and 24. It will be appreciated that the circuits providing energization for lamps 20 and 24 may be of a complex nature and that the series resistors 44 and 46 may therefore be remote from the lamps 20 and 24 and in series with other circuit components which do not form part of this invention and are not shown. Although impedance values for the various circuit components are not specified, it will be understood that the series impedances for the various neons will be so chosen that whenever operation is required to provide output illumination, the impedances will be so chosen as to result in a neon current in the order of one milliampere.

In order to simplify the drawings and make them clearer and more easily understood, in all of the remaining figures, the lamp shunt resistors such as 38, 40 and 42 are omitted, and all of the input connections including the series resistors 44 and 46 to the input light source lamps are omitted, but it will be understood that corresponding connections and impedances are to be employed in the practical embodiments of the invention. Also the convention will be employed that each photoconductor is arranged to be illuminated only by the first light source to the left of that photoconductor and in horizontal alignment therewith. Furthermore, in all of the embodiments of the invention which are here disclosed, each photoconductor is arranged for illumination from only one light source.

Also, to further simplify the drawings, the power supply connections are not wired in, either at the common ground connection or at the high voltage connections. The common ground connections are indicated conventionally by the ground symbol, and the high voltage connections are indicated by a terminal symbol as at 48 with a + sign. The value of the supply voltage may be selected to conform to the impedance values and current requirements of the circuit design. A good workable value of supply voltage has been found to be about 300 volts. When employing neon lamps as the light sources, it has been found desirable to employ a direct current power supply source, or an alternating current power supply at a frequency of about 1000 cycles. With other light sources, other voltages and frequencies doubtlessly could be employed. It will be understood that conventional sources of power may be employed to obtain satisfactory operation of the systems of the present invention.

Whenever there is a lighting up of the output light source 32, an electrical output may be derived from the optical output by means of an output photoconductor 50 which is connected in series with an impedance 52 across the power source. Thus, when the output light source 32 is illuminated and reduces the impedance of photoconductor 50, most of the power source voltage appears across the impedance 52. Accordingly, the output terminal 54, which is connected intermediate photoconductor 50 and impedance 52, rises in potential from near ground potential to near power supply potential. It will be understood that the apparatus which may be connected to the output terminal 54 (not shown) may have an adequate impedance to ground so that the impedance 52 need not be provided ahead of the output terminal 54 as shown. It will also be understood that the photoconductor 50 may form part of a complicated photoconductor switching network which may follow the teachings of the present invention or which may be of another kind. It is contemplated, for instance, that the photoconductor 50 could serve in a capacity similar to the photoconductor 22 in a subsequent step of logic. It is one of the important features of the systems of this invention that complete electrical isolation is achieved between levels of logic because of the purely optical coupling such as that between the output lamp 32 and the photoconductor 50. Similar electrical isolation through the optical coupling is available between input lamps 20 and 24 and the respective photoconductors 22 and 26.

Figure 2:
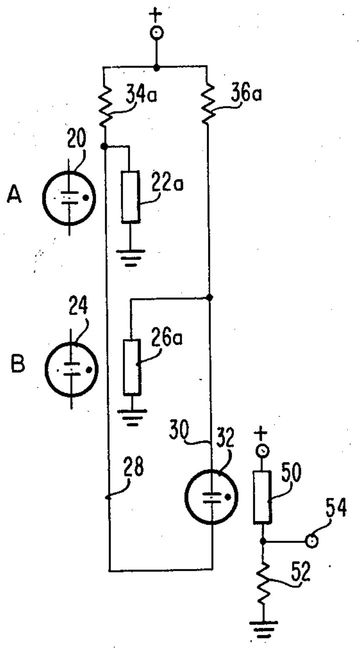

FIGURE 2 is a modification of FIGURE 1. Although this figure appears superficially to be quite different from FIGURE 1, it also provides the logical function of Exclusive-OR, and it is apparent upon further inspection that this figure is essentially the same as FIGURE 1 except for a reversal in the polarities of the power supply voltage connections. Thus impedances 34*a* and 36*a* corresponding to 34 and 36 in FIGURE 1, are connected to the high voltage side of the power supply source instead of to the grounded side, and the photoconductors 22*a* and 26*a* corresponding to photoconductors 22 and 26 in FIGURE 1, are connected to ground instead of to the high voltage side of the power supply. In operation, with no inputs, input lamps 20 and 24 will both be dark and photoconductors 22*a* and 26*a* will both be at a high impedance level so that both terminals 28 and 30 will be at approximately the same high potential so that output light source 32 will remain dark. If both inputs A and B are active to light input lamps 20 and 24, then both photoconductors 22*a* and 26*a* will be at a low impedance condition so that both terminals of the output lamp 32 will be at the same low voltage state to keep the output lamp dark. However, in the presence of only one input, only the photoconductor 22*a* or the photoconductor 26*a* will be at a low impedance state so as to pull its associated terminal 28 or 30 down to a low potential value, thus causing the output light source to light up to provide an optical output which may be detected as an electrical output at terminal 54.

Figure 3:
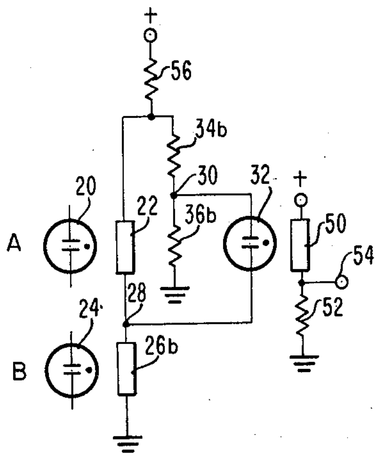
FIGURE 3 is a schematic diagram of another modification of the circuit of FIGURE 1 which also provides the "Exclusive-OR" function.

In FIGURE 3 there is shown a further modification of the circuit of FIGURE 1 which again provides the Exclusive-OR function. Here, the B input photoconductor 26*b* is connected to the same output lamp terminal 28 as the A input photoconductor 22. And the network associated with output lamp terminal 30 consists of two fixed resistors 34*b* and 36*b*. An additional common current limiting resistor 56 may be employed. In viewing this as a modification of FIGURE 1, it will be observed that photoconductor 26 and resistor 34 of FIGURE 1 have simply been interchanged in their circuit positions and shown as 26*b* and 34*b*. In FIGURE 3, the resistors 34*b* and 36*b* preferably have approximately equal resistance values and the photoconductors 22 and 26*b* have approximately equal dark resistances and equal illuminated resistances. Accordingly, when there are no inputs or when there are two inputs, the voltages at output lamp terminals 28 and 30 will be approximately equal and no output will be evident. However, if there is an A input resulting in a lowered resistance for photoconductor 22 only, terminal 28 will become positive with respect to terminal 30 so as to light up the output lamp 32. Similarly, if there is a B input only, photoconductor 26*b* will achieve a lowered resistance so as to cause a lowering in the potential of terminal 28 and thus light up the output lamp 32.

Figure 4:
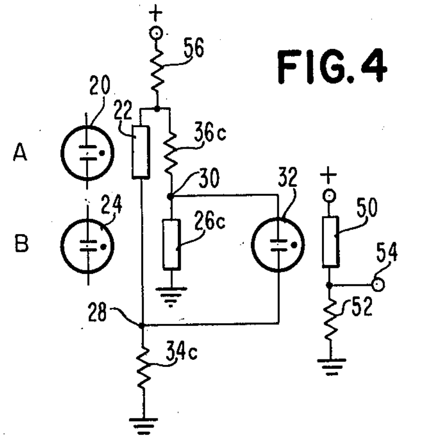
FIGURE 4 shows a modification of the invention which provides the negative of "Exclusive-OR" which is sometimes referred to as "Not Exclusive-OR" or "If and Only If."

FIGURE 4 shows a further modification of the circuit of FIGURE 1 in which photoconductor 26 and resistor 36 are interchanged in position as shown at 26*c* and 36*c*. This modification provides the inverse of the Exclusive-OR function which is sometimes characterized as "NOT Exclusive-OR" or as "If and Only If." Briefly stated, if inputs A and B are both absent or if inputs A and B are both present, there will be an output manifested by the lighting up of output lamp 32. But if either A or B is present alone, there will be no output. The high dark impedances of photoconductors 22 and 26*c* when no inputs are present cause terminal 30 to be at a substantially higher voltage than terminal 28 to light up output lamp 32. If photoconductor 22 is illuminated, terminal 28 rises to a value approximating that of terminal 30 to extinguish lamp 32. However, if photoconductor 26*c* is illuminated, terminal 30 drops to a potential approximately the same as the potential of terminal 28 to again extinguish lamp 32. However, if photoconductors 22 and 26*c* are both illuminated, terminal 28 is at a substantially higher potential than terminal 30 so as to again light the output lamp 32. In connection with this figure, the drawing convention mentioned above and followed in this application again should be emphasized as follows: Each photoconductor is illuminated only by the first light source to the left of that photoconductor and in horizontal alignment therewith. For instance, photoconductor 26*c* receives no illumination from output lamp 32, but is arranged to receive all of its illumination from input lamp 24.

Figure 5:
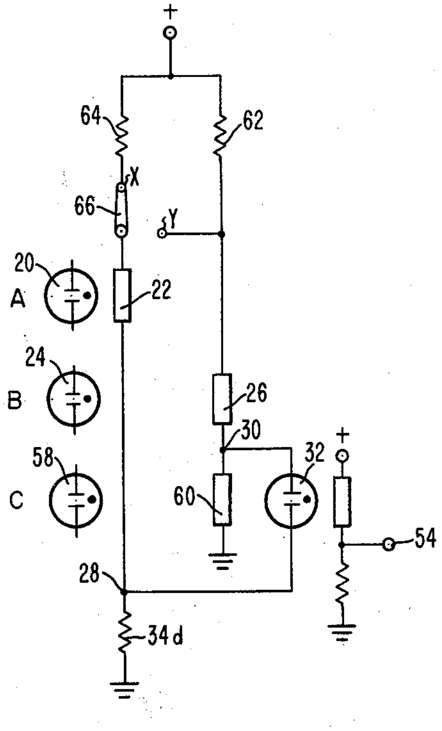
FIGURE 5 shows a modification of the invention which is capable of providing various logical outputs in response to various combinations of three inputs.

FIGURE 5 illustrates a further modification of the invention in which a third input C is added by means of a third input neon 58 illuminating a third photoconductor 60. It will be seen that photoconductor 60 replaces the fixed impedance 36 of FIGURE 1. Alternative current limiting resistors 62 and 64 are provided which may be selected by means of a switch 66 which may be placed either in the X position as shown, or in the Y position. With the switch 66 in the X position, the circuit branch containing photoconductor 22 has its own current limiting resistor 64, and the circuit branch containing photoconductor 26 has its own current limiting resistor 62. However, with switch 66 in the Y position, both of these circuit branches share the common current limiting resistor 62. With switch 66 in the Y position, inputs A and B may negate one another. That is, if A and B inputs are present concurrently, both terminals 28 and 30 tend to achieve a similar high voltage so that no output will occur. However, with switch 66 in the X position so that each of these circuit branches contain independent current limiting resistors 62 and 64, this negation principle may not apply. This is true when grounding resistor 34*d* at terminal 28 has a value substantially greater than the illuminated resistance of photoconductor 60.

Following the principles illustrated by the explanations of the preceding figures, with switch 66 in the Y position, the conditions under which the circuit of FIGURE 5 will operate are either that there must be an A input without a B input and with a C input, or there must be a B input without an A input and without a C input. These conditions for operation may be expressed in Boolean algebraic terminology as follows:

$$A\bar{B}C+\bar{A}B\bar{C} \text{ (with switch position Y)}$$

When switch position X is employed, the conditions for operation will be as follows: With an input from A, and an input from C (the presence or absence of a B input having no consequence), or with an input from B and with no input from C (the presence or absence of an A input having no consequence). Again, this may be expressed in Boolean algebraic terminology as follows:

$AC+B\overline{C}$ (with switch in X position)

It will be appreciated that the versatility provided by the switch 66 often may be unnecessary and may be omitted. The separate load limiting resistors may be permanently provided as in the present circuit with switch position X. Or a common load limit resistor may be permanently provided as with switch position Y, the selection being made according to the logical requirements of the system in which the circuit is employed.

Figure 6:
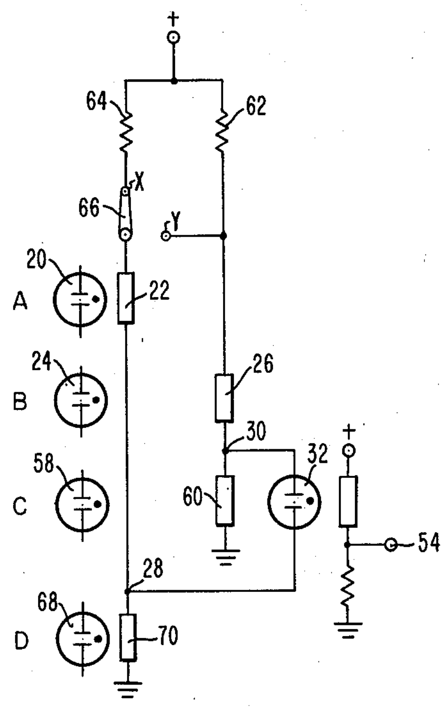
FIGURE 6 shows a modification of the invention which is capable of providing various logical outputs in response to various combinations of four logical inputs.

FIGURE 6 represents a further modification which is similar to FIGURE 5 in every respect except that a fourth input D represented by neon lamp 68 is added which is arranged to illuminate a photoconductor 70 which occupies the circuit position of impedance 34*d* in FIGURE 5. Again there is a difference in the logic obtainable depending upon the position of the switch 66. With the Y switch position, an output is obtained with the combination of inputs from A and C in the absence of inputs from B and D; or with inputs from B and D in the absence of both A and C inputs. These operating conditions may be expressed in Boolean algebra notation as follows:

$A\overline{B}C\overline{D}+\overline{A}B\overline{C}D$ (with Y switch position)

With the X switch position as shown in FIGURE 6, the circuit will operate with an A input and a C input without a D input (regardless of the condition of B), or with a B input and a D input in the absence of a C input (regardless of the condition of A). The Boolean expression for these conditions is as follows:

$AC\overline{D}+BD\overline{C}$ (switch in X position)

Figure 7:
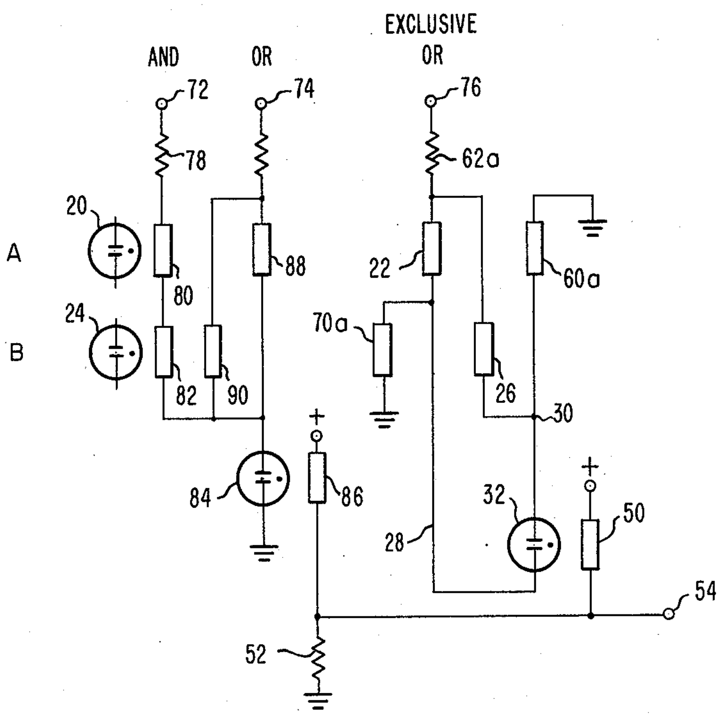

It will be appreciated from the explanations that follow that embodiments of the invention such as those shown in FIGURES 5 and 6 employing more than two inputs can be modified to obtain special logical functions, if desired, by switching more than one photoconductor with the same input light source. This principle of reducing the number of optical input signals, and having at least one of the optical input signals switch more than one photoconductor network arm is illustrated in FIGURE 7. FIGURE 7 also illustrates the utility of a modification of the system of FIGURE 6 as will appear from the following explanation.

FIGURE 7 is a combination logical circuit which is capable of providing at the output terminal 54 any selected one of three different logical output functions of two inputs A and B. Thus, power may be applied alternatively at one of the function selection terminals 72, 74 or 76 in order to alternatively select the AND function, the OR function or the Exclusive-OR function. It will be recognized that the "Exclusive-OR" portion of this circuit, connected for energization from terminal 76, is a modification of the circuit of FIGURE 6 in which inputs C and D have been omitted. Photoconductor 60 has been arranged as shown at 60*a* in FIGURE 7 to be switched by illumination from input light source A, and photoconductor 70 has been repositioned as shown at 70*a* to be switched from the B input lamp 24. From the reasoning of the previous explanations, it will be appreciated that this is another Exclusive-OR circuit. If there is an A input, photoconductors 22 and 60*a* are switched on to provide a high potential on terminal 28 and a low potential on terminal 30 to light up the output lamp 32. If there is a B input alone, photoconductors 26 and 70*a* are switched on to give reverse potential conditions at terminals 28 and 30 and to again light up output lamp 32. However, if both inputs are present and all four photoconductors are switched to the low resistance condition, the potentials at terminals 28 and 30 are essentially equal and there is no output. This Exclusive-OR circuit is superior in some ways to those shown in FIGURES 1, 2 and 3 because both the high and low voltage arms are switched by photoconductors for operation. Therefore, the total impedance change for operation is greater and the operating tolerances may be greater without risk of erroneous operation.

The AND circuit of FIGURE 7, which is energized from terminal 72, includes the series combination of current limiting resistor 78, photoconductors 80 and 82, and an output neon 84. Arranged for illumination by neon 84 is a photoconductor 86 which is connected to cause a rise in the potential at output terminal 54. It will be appreciated that unless both A and B inputs are present, the photoconductors 80, or 82, or both will be in the high impedance state and will prevent sufficient voltage to light neon 84 to provide an output. On the other hand, if A and B inputs are both present, photoconductors 80 and 82 are both illuminated the voltage is supplied to neon 84 to provide an output. With the OR circuit supplied from terminal 74, since the photoconductors 88 and 90 are connected in parallel, illumination of either of these two photoconductors due to an input from A, or B, or both, will provide a lowered impedance path to the neon 84 to provide an output.

Another important principle included within the scope of the present invention, is that the basic circuits such as that illustrated by FIGURE 1 may be modified in such a way that individual photoconductor arms of the networks may be expanded and re-arranged to include a number of photoconductors arranged in serial and parallel relationships to accomplish various logical functions. This principle is illustrated in FIGURE 8 which is basically related to the embodiment of FIGURE 1.

Figure 8:
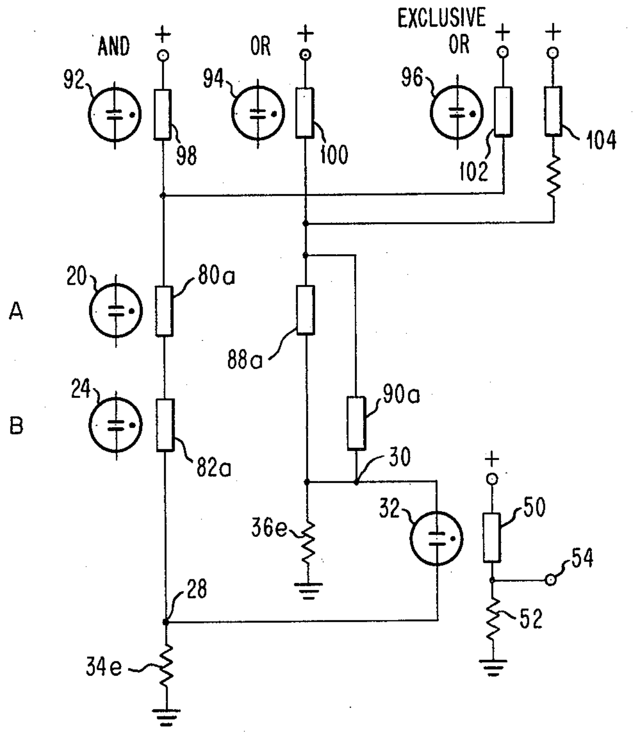
FIGURE 8 shows an alternative form of the combination AND, OR, or Exclusive-OR circuit employing the teachings of the present invention in which the photoresponsive elements forming the AND circuit and the OR circuit are also employed to derive the Exclusive-OR function.

FIGURE 8 shows an alternative combination AND, OR, Exclusive-OR circuit. In this embodiment, one of the various possible functions is selected by providing an optical selection input by means of the AND light source 92, the OR light source 94, or the Exclusive-OR light source 96. These optical inputs provide for the switching of electrical inputs alternatively through the photoconductors 98, or 100, or 102 and 104. The AND selector photoconductor 98 is connected to supply voltage to the photoconductor AND circuit including the photoconductors 80*a* and 82*a* so that when both the A and B inputs are present, the terminal 28 is raised in potential to light the output lamp 32. Similarly, when the OR input photoconductor 100 is illuminated, voltage is thus applied to the OR circuit including parallel photoconductors 88*a* and 90*a* so that if either an A or a B input is present a lowered impedance path from the power supply exists to terminal 30 to light the output lamp 32. If the Exclusive-OR function is selected by illumination of light source 96, photoconductors 102 and 104 respectively apply voltage to both the AND and OR circuits just mentioned. Accordingly, if there is only one input from either A or B, terminal 30 will be raised in potential through either photoconductor 88*a* or 90*a* in combination with photoconductor 104. However, if both inputs A and B are present, the potential at terminal 28 will also be elevated through the combination of photoconductors 80*a*, 82*a* and 102 so that the output lamp 32 will not be illuminated. This concurrent elevation of the potentials of terminals 28 and 30 cannot occur through the selection of either the AND input at photoconductor 98, or the OR input at photoconductor 100, because these inputs are never concurrently selected.

The analogy mentioned above between FIGURE 1 and FIGURE 8 is now quite apparent. The photoconductor arm of the network connected to output lamp terminal 28 represented by photoconductor 22 in FIGURE 1 may be said to have been expanded in FIGURE 8 to include all of the following photoconductors: 80*a*, 82*a*, 98 and 102. Similarly, the photoconductor network arm represented by photoconductor 26 in FIGURE 1 has been expanded in FIGURE 8 to include photoconductors 88*a*, 90*a*, 100 and 104.

Figure 9:
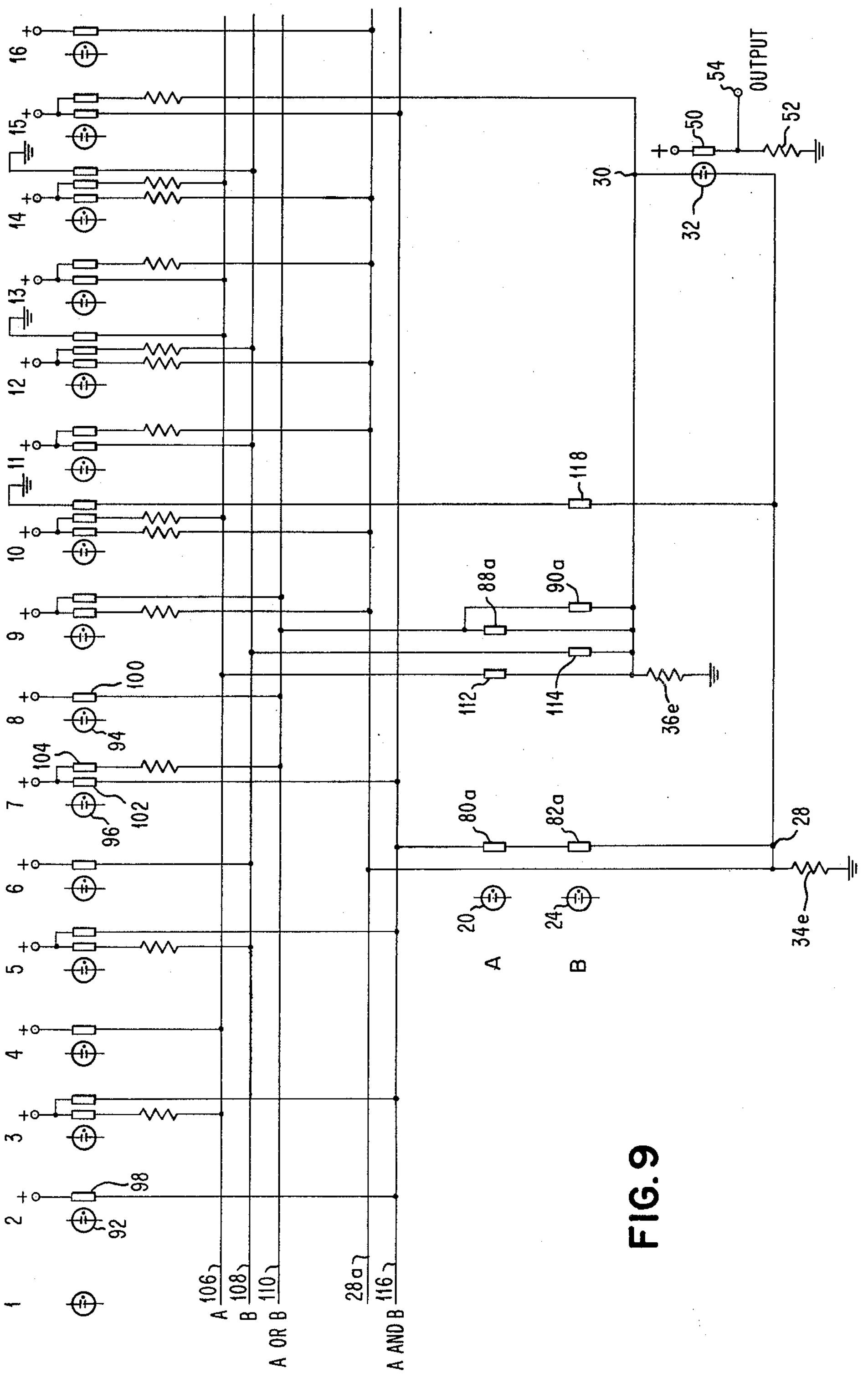
FIGURE 9 is a combination logical circuit in accordance with the teachings of the present invention in which the theme of the system of FIGURE 8 is expanded upon in order to provide for the selection of any one of the sixteen possible logical functions of two input variables.

FIGURE 9 shows a system in accordance with the teachings of the present invention which is capable of providing an output which is a function of any selected one of the sixteen possible logical functions of two input variables A and B. The logical functions to be selected, as indicated by the numbers 1 through 16 identifying the individual selectors across the top of FIGURE 9, are further identified in the chart of FIGURE 10 by the numbers 1 through 16 appearing in the fifth column from the right in the chart.

In FIGURE 10, the last four columns in the first two lines in the chart show the four possible combinations of inputs A and B, the presence of an input being indicated by the character "1," and the absence of an input by the character "0." Similarly, the remaining lines of the last four columns of the chart indicate the presence or absence of an output signal respectively by the characters "1" or "0" for the input conditions defined in the first two lines for each of the four columns. Thus, for instance, function 8 is the OR function which provides an output, as indicated, whenver there is at least one input from either A or B. Similarly, function 2 is the AND function in which an output is manifested only when both inputs A and B are present.

It will be observed that the portions of the systems of FIGURE 9 providing the AND, OR and Exclusive-OR functions (that is functions 2, 8 and 7) correspond quite closely to the system of FIGURE 8. Accordingly, an understanding of the operations of these portions of FIGURE 9 will follow directly from an understanding of the operations of FIGURE 8.

To simplify the wiring in the system of FIGURE 9, a number of interconnecting busses are provided. A first group of these busses numbered 106, 108 and 110 are respectively arranged for connection through the A function photoconductor 112, and the B function photoconductor 114, and the OR photoconductor circuit including photoconductors 88a and 90a, all leading to the terminal 30 of the output lamp 32. Similarly, the second group of busses consisting of bus 28a, and the AND buss 116 are respectively connected directly to terminal 28 and through the AND circuit including AND photoconductors 80a and 82a to the terminal 28. Thus, whenever an A input is present, photoconductor 112 is illuminated by input lamp 20 and a low impedance path thus exists between A bus 106 and terminal 30 of output lamp 32. Then, if a high voltage path or a ground path of low impedance is applied through one of the function selectors to bus 106, that potential is also applied (on a somewhat diminished, but operative scale) to terminal 30 of output lamp 32. Similarly the B bus 108 is connected through a lowered impedance provided by photoconductor 114 to terminal 30 whenever the B input is present. And the OR bus 110 is so connected through photoconductors 88a and 90a whenever either an A or B input is present. Bus 28a is always connected to terminal 28 and the AND bus 116 is connected through the AND circuit photoconductors 80a and 82a to the terminal 28.

Consistent with the preceding explanations, if no low impedance paths are provided for either terminals 28 or 30 to the high voltage power source, then there is no output. Also, if low impedance paths are provided for both terminals 28 and 30 to the high voltage supply, then there is again no output. But if either terminal is provided with a low impedance path to the voltage supply, without such a path to the other, then an output is provided. Using these principles, the photoconductor circuit paths provided by the various function selectors provide the selected function of the input quantities A and B. For instance, when function 3 is selected, an output results whenever A is present without B. Function 5 is the converse of this, providing an output whenever B is present without A. It is believed that the operation of most of the system of FIGURE 9 will be clear from the preceding explanations. It should be kept in mind always that only one of the sixteen functions is to be selected at any one time.

The functions 10, 12 and 14 are of particular interest because they each require the provision for a low impedance photoconductor path to ground for particular conditions of operation. Thus, for function 10, in the absence of either input A or input B, an output is obtained by reason of the connection through the first function ten selector photoconductor to the bus 28a, which raises the potential of terminal 28 of the input lamp. However, in the presence of an A input only, the path through the second ten selector photoconductor is effective to the A bus 106 and the A photoconductor 112 to raise the potential of terminal 30 so that the output lamp 32 is extinguished. If there is an A input and a B input, then the second ten selector photoconductor is still effective to raise the potential of output lamp terminal 30 but the third ten function selector photoconductor is effective through the B photoconductor 118 to provide a low impedance path from the output lamp terminal 28 to ground. This overpowers the high voltage path through bus 28a supplied through the first selector ten photoconductor to thus causes the output lamp 32 to light. With a B input in the absence of an A input, the third photoconductor of the ten function selector again operates through B photoconductor 118 to lower the potential of terminal 28. However, no low impedance path is provided for the purposes of raising terminal 30 so that output lamp 32 remains dark. In a similar manner, function 12 provides for an output without A or B inputs, or in the presence of both A and B inputs, or in the presence of an A input only. Function 14 switches in a similar manner to provide an output in the presence of no A and B inputs, a B only input, or A and B inputs.

It will be understood that in particular systems, not all of the sixteen functions shown in FIGURE 9 may be required. Accordingly, such functions as are not required may be omitted from the system without impairing the utility or operability thereof. It is one of the virtues of photoconductor elements that the dark impedance of each photoconductor is so high that many photoconductor elements may be placed in circuits which are essentially in parallel, as long as definite rules are observed regarding the number of such parallel circuit photoconductors to be illuminated at one time. Thus, although all of the photoconductors switched by function selector inputs may be connected to a common power source, no difficulties result from these parallel connections because of the rule that only one function is selected at any one time so that only one complete circuit path of photoconductors in the low conductive state to each output lamp terminal is effective at any one time.

Figure 11:
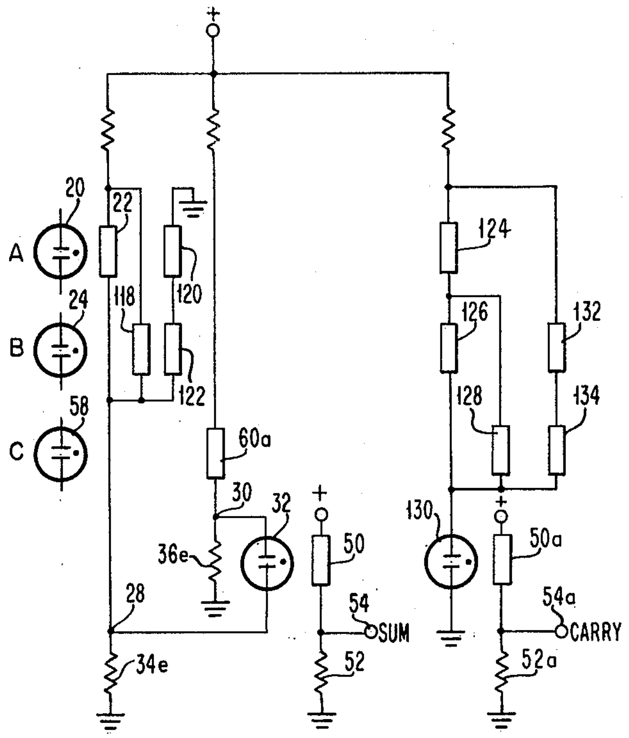
FIGURE 11 shows a binary full adder which is carried out in accordance with the teachings of the present invention.

FIGURE 11 shows a binary full adder circuit following the teachings of the present invention. The portion of the circuit which provides the sum output is basically a modification and an elaboration of the circuit shown in FIGURE 1. It is also closely related to the FIGURE 9 functions 10, 12 and 14. As is well known, the sum output must be indicated whenever there are one or three inputs to the full binary adder. In the present circuit of FIGURE 11, this is accomplished as follows: If a single input appears at A or B, through the illumination of lamp 20 or lamp 24, then output lamp terminal 28 is provided with a low impedance path to the high potential source through either photoconductor 22 or photoconductor 118 connected in parallel between the voltage source and terminal 28. If the single input is at C, illuminating lamp 58, then photoconductor 60a provides a low impedance path from the potential source to output lamp terminal 30. It is seen therefore that any one of these inputs will provide for a sufficient voltage across the output lamp 32 to provide an output illumination signal which is converted to electrical output at terminal 54. However, if two inputs are present at A and B an AND circuit including photoconductors 120 and 122 is effective to ground out the terminal 28 to prevent the lighting of output lamp 32. If the two inputs consist of input C and either input A or input B, then both terminals 28 and 30 are elevated in potential so that there is insufficient drop across the output lamp 32 to provide a firing of that lamp. However, if all three inputs are present, the A and B leg of the circuit is grounded out through photoconductors 120 and 122, but the terminal 30 is elevated in potential through the illumination of photoconductor 60*a* so that there is again sufficient voltage drop across the output lamp 32 to provide the appropriate output.

The portion of the circuit providing the carry output includes the A input photoconductor 124 which is connected in series with a parallel combination of B and C photoconductors 126 and 128 to provide a low impedance path to the output lamp 130 whenever there is a concurrence of an A input with either a B or C input. Similarly, a parallel photoconductor AND circuit including photoconductors 132 and 134 is provided to receive B and C inputs and to provide a low impedance path through the output lamp 130 whenever there is a concurrence of B and C inputs. Thus it will be appreciated that output lamp 130 is energized in the presence of at least two of the three inputs A, B and C. The binary full adder circuit of FIGURE 11 is believed to clearly illustrate the utility and the versatility of the present invention in providing complex output functions with simple circuit configurations.

FIGURE 12 shows a circuit which expands upon the principle particularly shown in the A and B switching leg in the sum circuit of the binary full adder of FIGURE 11. The circuit of FIGURE 12 is capable of providing an output which is a function of four inputs such that an output is provided whenever an odd number of the four inputs is present. For this purpose, the condition of no inputs is considered to be an even number of inputs. An understanding of the operation of the embodiment of FIGURE 12 will follow naturally from an understanding of the summing circuit of FIGURE 11. If there is a single input in the group consisting of A and B then output lamp terminal 28 will be raised in potential to provide an output. Similarly, if there is a single input in the input group C and D, the terminal 30 will be elevated in potential to provide an output. If there is a single input in each of the groups A and B and C and D then output lamp terminals 28 and 30 will both be elevated in potential and no output will result. This is the desired result for two inputs. As previously described, if there are two inputs which happen to be A and B, the AND circuit including photoconductors 120 and 122 ground out the high potential which would otherwise be applied at terminal 28 of the output lamp 32. A similar result occurs through the agency of an AND circuit to ground provided by series connected photoconductors 136 and 138 if the two inputs happen to be C and D. It follows then that if four inputs are present, both terminals 28 and 30 are grounded out through the AND circuits so as to prevent any output. However, with three inputs, it will be apparent that one of the AND circuits is effective to ground out one of the terminals 28 or 30 while the other terminal is elevated in potential so as to provide an output. Thus, the complete satisfaction of the condition that only an odd number of a possible total of four inputs shall actuate the circuit is satisfied.

The system of FIGURE 13 represents a further modification of the summing circuit system of FIGURE 11 which provides an output only under the circumstances where there is a single input of the three inputs A, B and C. This result is accomplished simply by adding a three-way photoconductive AND circuit including photoconductors 140, 142 and 144 which connects terminal 30 to ground so as to prevent an output under the circumstance of three inputs. This circuit is sometimes referred to as a "One and Only One" circuit.

Up to this point, we have been concerned with systems in accordance with the teachings of the present invention which may have two, three or four inputs. It is apparent, however, that larger numbers of inputs may be employed in systems according to the teachings of the present invention for the purpose of obtaining various logical outputs. FIGURES 14 and 15 help to illustrate these possibilities.

FIGURE 14 illustrates what may be characterized as a general form of the present invention because it shows that up to six or more input signals may be employed to photoelectrically switch each of the branches of each of the impedance networks connected to the terminals 28 and 30 of the output lamp 32. Specifically, a feature shown in FIGURE 14 which has not been shown in previous figures is that the grounding impedances 34*e* and 36*e* may be switched to ground through photoconductors 60*b* and 70*b* which may represent independent inputs from lamps 58 and 68 representing functions C and D. More direct ground connections also may be provided in response to inputs E and F through lamps 146 and 148 which respectively illuminate photoconductors 150 and 152. It will be appreciated that these more direct connections to ground provide an overriding potential determining effect. For instance, the E input overrides the C input so that it will make no difference whether there is a C input if an E input is also present. This principle was illustrated in the systems of FIGURES 11, 12, and 13 in which the grounding AND circuit including photoconductors 120 and 122 provided an overriding effect by shunting around the impedance 34*e*. In this general form of the invention the switch 66 and the current limiting resistors 62 and 64 are again shown. And different logic is available from the circuit of FIGURE 14 depending on the position of the switch 66. With the switch in the Y position, the conditions for an output from the circuit of FIGURE 14 may be expressed in terms of the Boolean expression for the inputs as follows:

$$AD\overline{BCE}+AF\overline{BE}+BC\overline{ADF}+BE\overline{AF}$$

(With switch in Y position)

As previously explained, it will be appreciated that a bar above a letter signifies the absence of an input corresponding to that letter, thus, the first term of the above expression calls for the presence of input signals A and D and the absence of input signals B, C and E. As usual in Boolean notation, the + sign indicates an OR so that the four terms of the expression indicate four alternative conditions which will provide an output. The omission of the letter corresponding to any input in any of the terms indicates that the presence or absence of such an input represented by that letter is immaterial to the operation of the circuit in that mode. Thus, in the operation contemplated by the first term of the above expression, it is immaterial whether there is an F input or not, as an output will be obtained whether or not such an F input is present.

In FIGURE 14, with the switch 66 in the X position, operation may be obtained under the various conditions indicated by the following Boolean algebra problem:

$$AD\overline{BCE}+AF\overline{E}+BC\overline{ADF}+BE\overline{F}+AB\overline{FE}+ABE\overline{F}$$

(With switch in X position)

One mode of operation of interest which is possible with FIGURE 14 for instance is as follows: With C and D inputs constantly present and all others absent and with switch 66 in the X position, if an A input is added, an output will be present, if a B input is then added together with the A input, no output will be present because the connections to output terminals 28 and 30 will be symmetrical. However, if an E output is added together with the A and B outputs, since a better ground connection will be supplied through the grounding photoconductor 150, the terminal 28 will be at a lower potential than the terminal 30 such that sufficient potential difference is present to fire the output lamp 32. However, if all of the inputs are present, terminal 30 will also be grounded through photoconductor 152 so that the output lamp 32 will again be darkened. It is thus to be seen that with a succession of added inputs in the order suggested, an alternation of an "output" and "no output" is obtained upon the occurrence of each additional input.

FIGURE 15 represents a further elaboration of the general system of FIGURE 14 in which two additional meaningful input functions G and H are provided through the agency of lamps 154 and 156. These new functions are possible because of the provision of connections to a source of negative potential, equal and opposite in polarity to the positive potential source, through the terminal indicated at 158. These connections are accomplished respectively through the photoconductors 160 and 162 and the current limiting resistors 164 and 166. It will be seen that through the operation of a switch 168 to the X position, resistors 164 and 166 may be operated as separate current limiting resistors for the branches containing photoconductors 160 and 162, or by placing the switch 168 in the Y position, resistor 164 becomes a common current limiting resistor for these two branch circuits. It will be appreciated that the provision of the negative potential source adds a new dimension to the operation of the circuit because the output lamp 32 may be energized by energy derived from the negative potential source to ground, independently of any switching supplying energy from the positive potential source. Accordingly, in certain modes of switching, an output may be obtained without the presence of either an A or a B input. Furthermore, in accordance with the principles explained above in connection with FIGURES 5, 6 and 14, in certain instances the position of switch 168 will determine whether or not input functions G and H are capable of overriding one another and will thus determine the logic which the system is capable of providing. It will be apparent also that the switches 66 and 168 may be switched together or independently between the X and Y positions so as to provide a number of variations in the logic which is available.

In considering the general forms of the system of this invention as shown in FIGURES 14 and 15, any of the individual input photoconductors could be replaced by a plurality of photoconductors which could be arranged in a large number of additional parallel branches. The individual parallel branches could include series combinations of photoconductors to provide AND circuits and combinations of AND and OR circuits as well as the OR functions inherently provided by the parallel branches themselves. Each of the photoconductors in these additional parallel branching circuits could in turn be switched by independent input light sources so that the number of inputs which it is possible to place functionally in parallel with each of the six or eight inputs shown is quite vast. It should be appreciated also that, following the teachings of various forms of the invention shown in the earlier figures, various circuit branches as shown in FIGURES 14 and 15 may be switched by photoconductors which are commonly illuminated by the same input light source. For instance, the Exclusive-OR portion of the system of FIGURE 7 provides for common illumination of the photoconductors 22 and 60*a* which concurrently provide plus voltage to output lamp terminal 28 and ground voltage (essentially) to output lamp terminal 30. This is equivalent to illuminating photoconductors 22 and 152 of the system of FIGURE 14 from the same input light source. Various other combinations of this nature may be employed for the accomplishment of various logical purposes.

It will be appreciated also that various switching branches may be permanently connected, or eliminated in the general forms of the invention shown in FIGURES 14 and 15, so as to reduce the number of inputs. The number of inputs should not be reduced to less than two however, since the result then becomes trivial. Some of the possible circuits which can result from elimination of circuit branches from FIGURES 14 and 15 are illustrated of course by FIGURES 1 through 6.

While the invention has been particularly shown and described with reference to preferred embodiments thereof, it will be understood by those skilled in the art that various changes in form and details may be made therein without departing from the spirit and scope of the invention.

What is claimed is:

1. A logical apparatus for providing an electrical digital output in response to a plurality of electrical digital inputs comprising a voltage responsive output light source, said output light source having two terminals, an impedance network for each of said terminals, a voltage source, each of said impedance networks comprising at least two impedances connected in series circuit relationship across said voltage source with the associated output light source terminal connected to the juncture therebetween, at least one of said impedances of each network having photoconductive properties to control the voltage at the associated terminal in response to an optical input received thereby, a resistor connected between said terminals in shunt with said light source, said resistor having a resistance value which is small in relation to the dark impedance of each of said photoconductive impedances, a separate electrical output circuit including a photoconductor arranged in proximity to said output light source for deriving an electrical output signal in response to light emitted thereby, a plurality of voltage responsive input light sources, each of said network photoconducting impedances having one of said input light sources arranged in proximity thereto to provide optical inputs thereto.

2. A logical apparatus for providing an optical output in response to a plurality of optical inputs comprising a voltage responsive light source having two terminals, an impedance network for each of said terminals, a voltage source, each of said impedance networks comprising at least two impedances connected in series circuit relationship across said voltage source with the associated light source terminal connected to the juncture therebetween, at least two of said impedances having photoconductive properties to control the voltage at the terminal respectively associated therewith in response to optical inputs received thereby, said light source having an effective circuit impedance between said terminals which is very low in relation to the dark impedance of each of said photoconductive impedances.

3. A logical apparatus for providing an optical output in response to a plurality of optical inputs comprising a voltage responsive light source having two terminals, an impedance network for each of said terminals, a voltage source, each of said impedance networks comprising at least two impedances connected in series circuit relationship across said voltage source with the associated light source terminal connected to the juncture therebetween, at least a portion of each of said two impedances of each network having photoconductive properties to control the voltage at the terminal respectively associated therewith, and at least two input light sources for providing logical optical inputs, each of said photoconductive impedances being arranged in proximity to one of said input light sources for photoconductive operation thereby.

4. A logical apparatus for providing an optical output representing the Exclusive-OR function of two optical inputs comprising a voltage responsive light source having two terminals, an impedance network for each of said terminals, a voltage source, each of said impedance networks comprising two photoresponsive impedances connected in series circuit relationship across said voltage source with the associated light source terminal connected to the juncture therebetween, two input light sources for providing the logical optical inputs, one of said photoconductive impedances of each of said networks being arranged in proximity to each of said input light sources for photoconductive operation thereby, the two photoconductive impedances in proximity to each of said input light sources being connected to opposite sides of said voltage source.

5. Apparatus for providing an optical output as a function of a plurality of optical inputs comprising a voltage responsive output light source having two terminals, a voltage source, fixed impedances connected from each of said terminals to one output connection of said voltage source, a logical combination of photoconductors connected in a network between each of said terminals and the other output connection of said voltage source, a plurality of input light sources arranged to supply logical optical input functions, each of said photoconductors being arranged in proximity to one of said input light sources for illumination thereby in response to the corresponding input function, the respective photoconductor networks connected to said two terminals being connected and arranged for response to different logical combinations of said inputs so that satisfaction of the conditions for operation of either network alone will provide an output, but satisfaction of the conditions for operation of both networks will provide no output.

6. Apparatus for providing a digital output which is any selected one of a plurality of different functions of a plurality of input variables comprising a voltage responsive output light source having two terminals, a voltage source, fixed impedances connected from each of said terminals to one output connection of said voltage source, a separate network of photoconductive impedances connected between each of said terminals and the other output connection of said voltage source, a plurality of voltage responsive input variable light sources arranged to supply optical input variable signals for which logical output functions are to be derived, said networks each comprising branch circuits including photoconductive impedances arranged in proximity to said input variable light sources to provide for low branch circuit impedances in response to predetermined combinations of input variables, a plurality of function selector input light sources corresponding to each of the functions of the input variables to be selected, each of said network branch circuits including at least one photoconductive impedance connected in series therewith and arranged in proximity to one of said function selector input light sources to establish a low impedance circuit path to the other output connection of said voltage source.

7. Logical apparatus for providing a digital output which is a function of a plurality of input variables comprising a voltage responsive output light source having two terminals, a voltage source having first and second output connections, a separate fixed impedance connected from each of said terminals to said first output connection of said voltage source, at least one branch circuit connected to each of said terminals, a plurality of function selector input light sources for selecting the desired function of the input variables, each of said branch circuits including a photoconductor arranged in proximity to one of said function selector input light sources and connected to provide a low impedance path from said branch circuit to one of said voltage source connections when the associated function is selected, said last named connection for at least one of said branch circuits from each of said terminals being a connection to said second voltage source output connection, a plurality of input variable light sources, at least one of said branch circuits also including at least one photoconductor arranged in proximity to one of said input variable light sources for completion of a low impedance path through said branch circuit in response to the presence of the associated input variable.

8. A combination logical circuit for providing a digital output which is a function of two input variables, said function being any one selected from the class including the AND function, the OR function and the Exclusive-OR function; comprising two input variable light sources for providing optical inputs corresponding to the input variables A and B, a function selector input light source for each of said AND, OR, and Exclusive-OR functions to be selected, a voltage responsive output light source having two terminals, a voltage source having first and second output connections, a separate fixed impedance connected from each of said terminals to said first voltage source output connection, a first branch circuit connected from one of said terminals to said second voltage source output connection and comprising series connected photoconductors respectively arranged in proximity to said A and B input variable light sources and a series connected AND function photoconductor arranged in proximity to said AND function selector input light source, a second branch circuit connected from said other terminal to said second voltage source connection and comprising two parallel connected photoconductors respectively arranged in proximity to said A and B input variable light sources and an OR function photoconductor connected in series with said last mentioned parallel combination of photoconductors and arranged in proximity to said OR function selector input light source, both of said branch circuits including auxiliary photoconductors respectively connected in parallel with said AND and OR photoconductors, said last named photoconductors being arranged in proximity to said Exclusive-OR function selector input light source.

9. A logical apparatus for providing any selected one of a plurality of functions of at least two input variables comprising a voltage responsive output light source having first and second terminals, a voltage source having first and second output connections, fixed impedances connected from each of said terminals to said first output connection, A and B input variable light sources, a group of interconnection busses for each of said output light source terminals, said first group of busses including a first bus directly connected to said first terminal and a second bus connected through two photoconductors in series to said first terminal to provide an AND function circuit, said two photoconductors being arranged respectively in proximity to said A and B light sources, said second group of busses including third, fourth and fifth busses, said third bus being connected to said second terminal through a single photoconductor arranged in proximity to said A light source, said fourth bus being connected to said second terminal through a single photoconductor arranged in proximity to said B input light source, said fifth bus being connected to said second terminal through two parallel connected photoconductors which are respectively arranged in proximity to said A and B light sources, a plurality of function selector input light sources corresponding to the functions to be selected, function selector photoconductors connected between each of said individual busses and one of said output connections of said voltage source, each of said function selector photoconductors being arranged in proximity to one of said function selector input light sources for establishing a low impedance connection between the associated bus and the associated voltage source connection, said voltage source connection for at least one of said function selector photoconductors associated with each of said function selector input light sources being to said second voltage source output connection.

10. An electrical apparatus for providing a digital output which is a function of a plurality of electrical inputs comprising a voltage responsive output light source having two terminals, a voltage source having first and second output connections, impedances connected from each of said terminals to said first voltage source output connection, first and second photoconductor circuits each including at least one photoconductor and respectively connected between each of said terminals and said second voltage source output connection, a third photoconductor circuit including at least one photoconductor and connected between one of said terminals and said first voltage source output connection, a plurality of voltage responsive input light sources, each of said photoconductors being arranged in proximity to one of said input light sources.

11. An electrical apparatus for providing an electrical digital output which is a function of a plurality of electrical inputs and in which complete electrical isolation is maintained between the inputs and the output by means of optical couplings, comprising a voltage responsive output light source having two terminals, a voltage source having first and second output connections, impedances connected from each of said terminals to said first voltage source output connection, first and second photoconductor circuits each including at least one photoconductor and respectively connected between each of said terminals and said second voltage source output connection, a separate voltage responsive input light source arranged in proximity to each of said photoconductors, said input light sources being operative separately to form a low impedance path through the associated photoconductor to operate said output light source and each of said input light sources being operative in the presence of concurrent operation by the other to form a balancing low impedance path through the associated photoconductor to prevent operation of said output light source, a third photoconductor circuit including at least one photoconductor and connected between one of said terminals and said first voltage source output connection and having a separate voltage responsive input light source arranged in proximity thereto, said last named input light source being operative to form a low impedance path through the associated photoconductor to said first voltage source output connection to operate said output light source in the presence of concurrent operation of said first mentioned input light sources, and an output circuit including a photoconductor arranged in proximity to said output light source and operative to provide an electrical output signal in response to an optical output.

12. An electrical apparatus for providing a digital output which is a function of a plurality of electrical inputs comprising a voltage responsive output light source having two terminals, a voltage source having first and second output connections, impedances connected from each of said terminals to said first voltage source output connection, first and second photoconductor circuits connected between said second voltage source output connection, and said respective terminals, said first photoconductor circuit comprising at least one photoconductor, said second photoconductor circuit comprising a plurality of photoconductors connected to respond to a predetermined logical function of optical inputs thereto, a plurality of voltage responsive input light sources, each of said photoconductors being arranged in proximity to a different one of said input light sources, said photoconductor circuits being operative separately to form a low impedance path to operate said output light source, and each of said photoconductor circuits being operative in the presence of concurrent operation by the other to form a balancing low impedance path to prevent operation of said output light source, a third photoconductor circuit connected between said first voltage source output connection and said terminal to which said second photoconductor circuit is connected, said third circuit comprising a plurality of photoconductors connected for response to a logical combination of optical inputs which is different from the combination to which said second circuit is responsive, said third circuit photoconductors each being arranged in proximity to a different one of said input light sources, said third circuit being operative to form a low impedance path to operate said output light source in the presence of concurrent operation of said first and second circuits.

13. An electrical apparatus for providing a digital output which is a function of a plurality of electrical inputs comprising a voltage responsive output light source having two terminals, a voltage source having first and second output connections, impedances connected from each of said terminals to said first voltage source output connection, at least one of said impedances comprising a first photoconductor circuit including a photoconductor and a fixed resistor connected in series therewith, second and third photoconductor circuits respectively connected between said terminals and said second voltage source output connection, and a fourth photoconductor circuit connected in shunt with said first photoconductor circuit, each of said photoconductor circuits including at least one photoconductor, and a separate voltage responsive input light source arranged in proximity to each of said photoconductors.

14. A photologic summing circuit for a full binary adder, which is capable of providing a sum output in response to one or three inputs while providing no output in response to two inputs, comprising a voltage response output light source having two terminals, a voltage source having first and second output connections, impedances connected from each of said terminals to said first voltage source output connection, A, B, and C voltage responsive input light sources, first and second photoconductor circuits respectively connected between said terminals and said second voltage source output connection, said first photoconductor circuit comprising two photoconductors connected in parallel and respectively arranged in proximity to said A and B input light sources, said second photoconductor circuit comprising a single photoconductor arranged in proximity to said C input light source, and a third photoconductor circuit connected between said first voltage source output connection and the terminal to which said first photoconductor is connected, said third photoconductor circuit comprising two photoconductors connected in series and respectively arranged in proximity to said A and B input light sources.

15. An electrical apparatus for providing a digital output which is a function of a plurality of electrical inputs comprising a voltage responsive output light source having two terminals, a voltage source having first, second and third output connections, said first and third output connections being arranged to supply equal voltages of opposite polarities with respect to said second output connection, impedances connected from each of said terminals to said second voltage source output connection, at least one of said impedances comprising a first photoconductor circuit including a photoconductor and a fixed resistor connected in series therewith, second and third photoconductor circuits respectively connected between said terminals and said first voltage source output connection, fourth and fifth photoconductor circuits respectively connected between said terminals and said third voltage source output connection, and a sixth photoconductor circuit connected in shunt with said first photoconductor circuit, each of said photoconductor circuits including at least one photoconductor, and a separate voltage responsive input light source arranged in proximity to each other of said photoconductors.

References Cited in the file of this patent

UNITED STATES PATENTS

| | | |
|---|---|---|
| 2,747,797 | Beaumont | May 29, 1956 |
| 2,885,564 | Marshall | May 5, 1959 |
| 2,892,093 | Henderson | June 23, 1959 |
| 2,936,380 | Anderson | May 10, 1960 |
| 2,947,874 | Tomlinson | Aug. 2, 1960 |
| 2,954,476 | Ghandi | Sept. 27, 1960 |
| 3,040,178 | Lyman et al. | June 19, 1962 |

OTHER REFERENCES

Pub. 3 R.C.A. Phototubes 1940 (16 pp.) (only page 7 relied on).

Pub. 2 I.B.M. Technical Disclosure Bulletin, vol. 1, No. 1, June 1958, pp. 27–28.

Pub. I Handbook of Automation Computation and Control by Grabble, Ramo, and Wooldridge, vol. 2, Wiley, 1959, page 17–04.

UNITED STATES PATENT OFFICE

CERTIFICATE OF CORRECTION

Patent No. 3,157,792 November 17, 1964

Paul R. Low et al.

It is hereby certified that error appears in the above numbered patent requiring correction and that the said Letters Patent should read as corrected below.

Column 1, line 50, for "impedance" read -- impedances --; line 62, for "FIGGURE" read -- FIGURE --; column 2, line 60, for "cross" read -- across --; column 10, line 20, for "causes" read -- cause --; line 25, for "purposes" read -- purpose --; column 18, line 53, strike out "other".

Signed and sealed this 29th day of June 1965.

(SEAL)
Attest:

ERNEST W. SWIDER
Attesting Officer

EDWARD J. BRENNER
Commissioner of Patents